US012524664B2

(12) United States Patent
Vo

(10) Patent No.: US 12,524,664 B2
(45) Date of Patent: Jan. 13, 2026

(54) MACHINE LEARNING PROCESS TO AUTOMATICALLY LABEL AND IDENTIFY MISLABELED DOCUMENTS AT LARGE-SCALE

(71) Applicant: The United States of America As Represented By The Director Of The National Geospatial-Intelligence Agency

(72) Inventor: Garret Vo, Gaithersburg, MD (US)

(73) Assignee: The United States of America As Represented By The Director Of The National Geospatial-Intelligence Agency, Springfield, VA (US)

( * ) Notice: Subject to any disclaimer, the term of this patent is extended or adjusted under 35 U.S.C. 154(b) by 783 days.

(21) Appl. No.: 17/813,094

(22) Filed: Jul. 18, 2022

(65) Prior Publication Data

US 2024/0020524 A1    Jan. 18, 2024

(51) Int. Cl.
*G06F 16/00* (2019.01)
*G06F 16/93* (2019.01)
*G06N 3/08* (2023.01)

(52) U.S. Cl.
CPC .............. *G06N 3/08* (2013.01); *G06F 16/93* (2019.01)

(58) Field of Classification Search
CPC ................................. G06F 16/93; G06N 3/08
USPC .......................................................... 706/25
See application file for complete search history.

(56) References Cited

U.S. PATENT DOCUMENTS 12,283,197 B2 *  4/2025  Salman .................. G06V 20/05
                                                               707/707

OTHER PUBLICATIONS

Ian Goodfellow, Yoshua Bengio, and Aaron Courville, Deep Learning, 2016, MIT Press, USA.
Pete Chapman, Julian Clinton, Randy Kerber, Thomas Khabaza, Thomas Reinartz, Colin Shearer, and Rüdiger Wirth, CRISP-DM 1.0 Step by Step Data Mining Guide, 2000, SPSS, USA.
Chris Manning and Hinrich Schütze, Foundations of Statistical Language Processing, 1999, MIT Press, USA.
Curtis Northcutt, Lu Jiang, and Isaac Chuang, Confident Learning: Estimating Uncertainty in Dataset Labels, Journal of Artificial Intelligence Research, Apr. 8, 2021, AAAI, Internet.
Konstantinos Sechidis, Grigorios Tsoumakas, and Ioannis Vlahavas, On the Stratification of Multi-label Data, 2011, ECML PKDD 2011, Part III, LNAI 6913, pp. 145-158, Germany.
Liang Yao, Chengsheng Mao, and Yuan Luo, Graph Convolutional Neural Networks for Text Classification, Nov. 13, 2018, AAAI, Internet.

(Continued)

*Primary Examiner* — Alexandria Y Bromell
(74) *Attorney, Agent, or Firm* — Colleen M. Raphael

(57) ABSTRACT

Systems and methods for automatically labeling documents and identifying mis-labeled documents at scale. Documents are pre-processed, divided into training and testing sets, and processed. After processing, a network graph is formed, the documents are embedded using a graph convolutional neural network, and the embedded documents are enhanced using a bag-of-words appending technique. The documents are then labeled using a neural network with a focal loss function. Optionally, the focal loss function can be used to calculate a probability value for each label. The probability values are used to identify mislabeled documents.

18 Claims, 8 Drawing Sheets

(56) References Cited

OTHER PUBLICATIONS

Petar Velickovic, William Fedus, William L. Hamilton, Pietro Lio, Yoshua Bengioy, and R Devon Hjelm, Deep Graph Infomax, 2019 ICLR conference paper, Dec. 21, 2018, New Orleans USA.

Piotr Szymański and Tomasz Kajdanowicz, A Network Perspective on Stratification of Multi-Label Data, European Conference on Machine Learning and Principles and Practices of Knowledge Discovery in Databases, Apr. 27, 2017.

Tomas Mikolov, Ilya Sutskever, Kai Chen, Greg Corrado, and Jeffrey Dean, Distributed Representations of Words and Phrases and their Compositionality, Neural Information Processing Systems Conference, 2013, Lake Tahoe USA.

Tsung-Yi Lin, Priya Goyal, Ross Girshick, Kaiming He, and Piotr Doll'Ar, Focal Loss for Dense Object Detection, International Conference for Computer Vision, 2019, Greece.

\* cited by examiner

MACHINE LEARNING PROCESS TO AUTOMATICALLY LABEL AND IDENTIFY MISLABELED DOCUMENTS AT LARGE-SCALE

STATEMENT OF GOVERNMENT INTEREST

The invention described herein was made by employees of the United States Government and may be manufactured and used by or for the Government for Government purposes without payment of any royalties.

BACKGROUND

Accurate data has become increasingly vital to our lives. Medical records influence everything from treatment plans and insurance premiums for individual patients to hospitals deciding whether to hire additional specialists or how to prioritize facility improvements. Equipment maintenance and repair records dictate production rates and system availability for users as well as identifying areas for improvements for equipment manufacturers. Financial reports and other audit documents are used by analysts as well as oversight and compliance personnel. Litigation among large corporations frequently involves hiring dozens of attorneys simply to sort through gigabytes of documents to determine what might be relevant to the dispute. Automatically identifying and labeling documents allows all of these varied tasks to be accomplished faster and allows analysts to consider larger volumes of appropriate documents while investing less time in validating that the documents are appropriate for the analytic task at hand. Proper document labeling and metadata is essential to fully capitalize on the benefits of applying big data analytics to the issues identified above, and others. While transformers have recently been utilized for natural language processing, the number of parameters required to develop an accurate transformer ranges from hundreds of millions to billions. As a result, analyses that utilize transformers tend to lack transparency, traceability, and explainability. This shortcoming makes transformer-based tools inappropriate for tasks where a "paper trail" may be necessary to explain or justify decision-making.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

The present application is directed to systems and methods for automatically labeling documents and identifying mis-labeled documents at scale. Documents are pre-processed, divided into training and testing sets, and processed. After processing, a network graph is formed, the documents are embedded using a graph convolutional neural network, and the embedded documents are enhanced using a bag-of-words appending technique. The documents are then labeled using a neural network with a focal loss function. Optionally, the focal loss function can be used to calculate a probability value for each label. The probability values are used to identify mislabeled documents. In contrast to transformer-based methods, the present application captures relationships between documents, requires fewer parameters, and appends word occurrences as additional features to make the training feature(s) more distinct. These distinctions all contribute to making the disclosure of the present application more transparent and explainable than transformer-based approaches.

The systems and methods disclosed in the present application can be applied to text documents of any format to automate the process of labelling documents or identifying incorrect labels in documents that were already labeled.

In at least one embodiment, the disclosed systems and methods are used to add labels to documents that were previously unlabeled.

In at least one embodiment, the disclosed systems and methods are used to identify incorrect labels on documents that were previously labeled by a human.

In at least one embodiment, the disclosed systems and methods are used to identify incorrect labels on documents that were previously labeled by an autonomous or automated system.

Many of the attendant features will be more readily appreciated by reference to the following detailed description and the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Further, various illustrated or described portions of processes may be re-ordered or executed in parallel in various different embodiments.

As used herein, the term "document" refers to a plurality of words in an electronic format, such as a PDF, .txt file, Microsoft Word document, spreadsheet, database, database entry, database query result, electronic presentation file (e.g., Microsoft PowerPoint), textual notes appended to an image or other file type, etc. Any document may be adjacent to one or more other pluralities of words, and one electronic file may contain one or more documents.

Further, although some of the examples provided may not contain features described with regard to another example, such a description is provided as an example and not a limitation. As those skilled in the art will appreciate, any of the features associated with an example may be incorporated into any other example provided without departing from the scope of the disclosure.

At least one embodiment of the present application is directed to systems and methods used to add labels to documents that were previously unlabeled or to identify incorrect labels in documents that were previously labeled.

Figure 1:
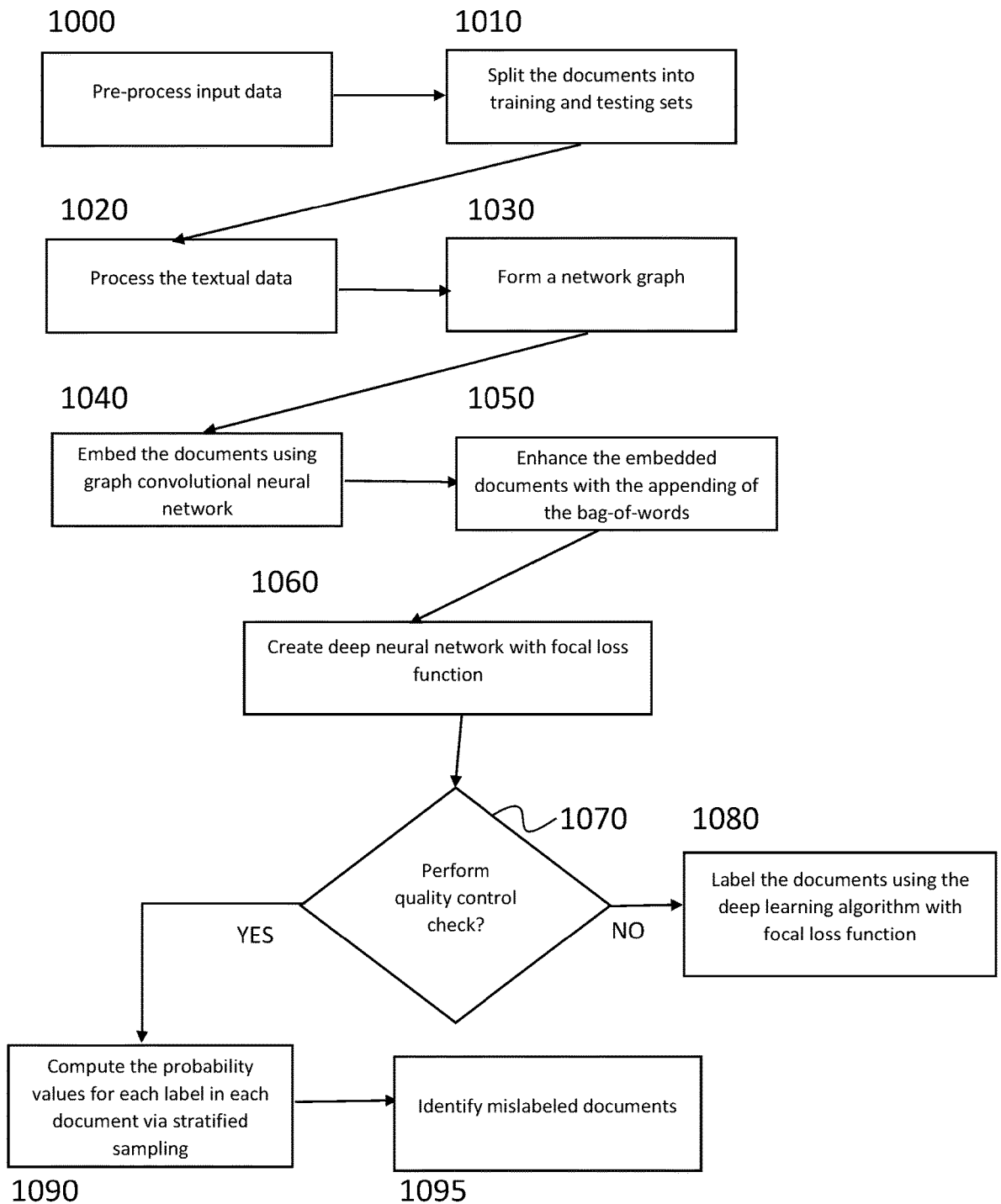
FIG. 1 is a flow chart of a method of automatically labeling documents or identifying mislabeled documents.

FIG. 1 is a flow chart of a method of automatically labeling documents or identifying mislabeled documents. Preprocessing 1000 comprises removing data elements that do not contain text and generating a one-hot vector for each document, described further below with regard to FIG. 2. Splitting 1010 the documents into training and testing sets comprises either: for sets of documents where no documents have multiple labels assigned, splitting randomly permuted documents into training and testing document sets based on a predetermined proportion; and, for sets of documents where at least one document has multiple labels assigned, the documents are split into training and testing document sets using iterative stratification. These actions are discussed further below with regard to FIG. 3 and FIG. 4.

Processing 1020 the textual data comprises removing one or more predetermined words from the data. In one embodiment, the one or more predetermined words comprise a set of words that are common in the language in which the documents are written. For example, for an English language document, the one or more predetermined words may comprise a, an, as, the, of, and/or other similar words. In another embodiment, the one or more predetermined words may be determined by a user. In this embodiment, the user may enter words manually, select words from a prepopulated list, or determine the words using any other method known in the art or using any combination of methods known in the art.

Processing 1020 the textual data further comprises computing the frequency of each word in each document, computing the number of documents in which each word occurs, and mapping each word to a position across all documents.

Forming 1030 a network graph comprises forming a network graph in which each node represents either a document or a word in a document. The network graph connects each document to the words in the document, connects each of the words in the document to each of the other words in the document, and connects each word to all of the documents in which the word appears. The weight value of an edge between a node representing a document and a word in the document is the term-frequency and inverse-document frequency (TF-IDF), described below. The weight value of an edge between words in the same document is the point-wise mutual information (PMI), described further below.

The network graph may be represented as an adjacent matrix A comprising PMI, TF-IDF, and Q. The values in matrix A are the weight values of the edges discussed above and Q=1 when i=j and 0 otherwise.

The PMI between words is computed as follows:

$$PMI(i, j) = \log \frac{p(i, j)}{p(i)p(j)}$$

$$p(i, j) = \frac{\#W(i, j)}{\#W}$$

$$p(i) = \frac{\#W(i)}{\#W}$$

In the equations above, i and j are words, PMI(i,j)>0, #W(i) is the number of sliding windows in a document that contains word i, #W(i,j) is the number of sliding windows containing both words i and j, and #W is the total number of sliding windows in the document.

The value of PMI is proportional to the degree of semantic connection between words i and j; therefore, only positive values of PMI are considered, and negative values of PMI are discarded.

The second value in A captures the connection between the document and its words. This value is called the term-frequency and inverse-document frequency (TF-IDF). The TF-IDF formula is $$TF\text{-}IDF(w,d,D) = TF(w,d)IDF(w,D)$$

where TF(w,d) is the term-frequency for the word w in the document d, and IDF(w,D) is the inverse-document frequency for the word w in the set of documents D, where d∈D. The formula for TF(w,d) is $$TF(w, d) = \frac{f_{w,d}}{\sum_{w' \in d} f_{w',d}}$$

where $f_{w,d}$ is the count of the word w in the document d and $f_{w',d}$ is the count of other word w', which is different from the word w. The formula for IDF(w,D) is $$IDF(w, D) = \log\left(\frac{N}{df(w)}\right) + 1$$

where N is the total number of documents in set D, and df(w) is the number of documents containing the word w.

Forming 1030 a network graph may further comprise constructing a matrix X. In one embodiment, X is an identity matrix. In another embodiment, X may comprise data derived from a transformer analysis of one or more documents. In other embodiments, X may be any appropriate feature matrix known in the art. Some embodiments may not utilize the matrix.

Embedding 1040 the document using a graph convolutional neural network (GCNN) comprises: creating a GCNN operating directly on the network graph described above; obtaining an encoder; computing a summary vector; computing a discriminator; optionally permuting X; obtaining a permuted encoder; computing a permuted discriminator; and solving an optimization. These actions are described further below with regard to FIG. 5.

Enhancing 1050 the embedded document with the bag-of-words comprises: for each document, determining a bagof-words vector and appending the bag-of-words vector to the embedded vector for that document, as described further below with regard to FIG. 6.

Creating 1060 a deep neural network comprises: creating a multi-layer network; computing a weight value for each of a plurality of labels; creating an encoding vector; calculating a focal loss; and optionally multiplying the focal loss function by the weighted values. These actions are described further below regarding FIG. 7.

In one embodiment, the labels comprise labels assigned to documents in the training set. in another embodiment, the labels may be manually entered by a user. In other embodiments, the labels may comprise labels chosen from a prepopulated list by a user or an automated system. In these embodiments, the list may be populated with labels from prior training sets, or labels previously approved or verified by a user or automated system. In some embodiments, the labels in the prepopulated list may be proposed based at least in part on the types of documents (e.g., for a set of financial documents, the prepopulated list may comprise labels appropriate for financial documents but not labels used for medical documents). In some embodiments, the labels in the prepopulated list may be proposed based at least in part on a user profile or attribute information (e.g., a user's profile may indicate that the user works with financial documents, causing the prepopulated list to comprise labels appropriate for financial documents but not labels used for medical documents).

In one embodiment, the decision 1070 regarding whether or not to perform quality assurance processing on the labeled documents is made by a user. In another embodiment, the decision is made by an automated system based on: data related to the labels; data related to the source of the documents, such as a reliability rating; data related to the user, such as profile or account settings or known user preferences; the number of documents; the number of labels; the length of the documents; any appropriate combination of the foregoing; or any other appropriate metric or criteria known in the art. In another embodiment, the decision is made by a hybrid of user and automated system decisions, such as: a user making the decision based on information, such as that mentioned above, provided by an automated system; an automated system making the decision based on information provided by a user, such as the user's subjective assessment of the accuracy of the labels or the accuracy of one or more sources of the documents or any other appropriate user input known in the art; or any other appropriate hybrid approach known in the art.

If the decision is no 1080, the neural network and modified focal loss function use the training data to learn how the labeled documents are labeled and then, based on that learning, label the unlabeled documents.

If the decision is yes 1090, a probability value is calculated for each label using the loss function or modified loss function. If one or more documents have multiple labels assigned, the probability value is calculated using iterative stratified sampling. If no documents are labeled with multiple labels, the probability value is calculated using k-fold stratified sampling. In one embodiment the value of k is equal to 10. In other embodiments, the value of k may be set to any appropriate value known in the art.

Identifying 1095 mislabeled documents comprises identifying labeled documents with labels whose probability value is below a threshold probability value for that label. In one embodiment, the threshold probability value is an average probability value for the label. In another embodiment, the threshold probability value is determined by a user. In this embodiment, the user may select a probability value directly, the user may select a percentile (e.g., selecting a percentile of 75, so that the threshold probability value is a value that results in 75% of the calculated probability values being less than the threshold), or the user may select the threshold probability value using any other technique known in the art. In any embodiment, the threshold probability value may be calculated or selected for all labels, for each label individually, or for groups of labels. In embodiments where the threshold is selected for groups of labels, the groups may be determined by a user, by an automated system, or by a combination of the two using any techniques known in the art. In some embodiments, a confidence table is used to identify mislabeled documents.

Identifying 1095 mislabeled documents optionally further comprises notifying a user of the identified mislabeled documents and soliciting feedback from the user to confirm or deny if the documents are mislabeled. Documents may be fed back through the steps of FIG. 1 after they have been properly labeled by a user or other automated system.

Those skilled in the art will appreciate that the steps of FIG. 1 may be executed by a single system, by a plurality of systems that are co-located, by cloud-based systems, by a plurality of systems that are geographically separate, or by any combination of the foregoing.

Figure 2:
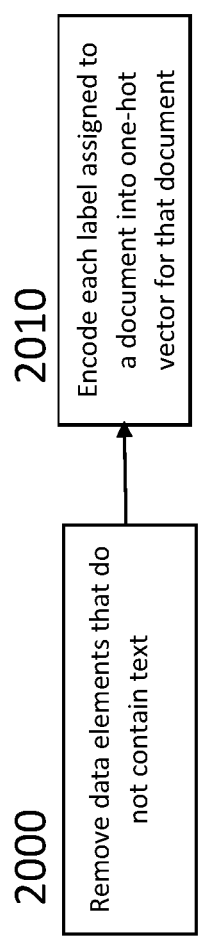
FIG. 2 is a flow chart of a method of preprocessing input data.

FIG. 2 is a flow chart of a method of preprocessing input data. Removing 2000 data elements that do not contain text can be done using optical character recognition (OCR), other techniques known in the art, or any combination of the foregoing. Removing 2000 the non-text data elements results in a set of data elements that only contains documents. Encoding 2010 labels into a one-hot vector comprises representing each label as a vector consisting of the values 0 and 1 where the length of the vector is equal to the number of possible labels and where a value of 1 indicates a label assigned to the document and a value of 0 indicates a label not assigned to the document. For example, a document with a one-hot vector of [1, 1, 0, 0, 0] has labels 1 and 2 assigned out of a possible 5 labels. The number of possible labels may be the number of labels in the documents being preprocessed, or the number of labels selected as described above, or any other appropriate number.

Figure 3:
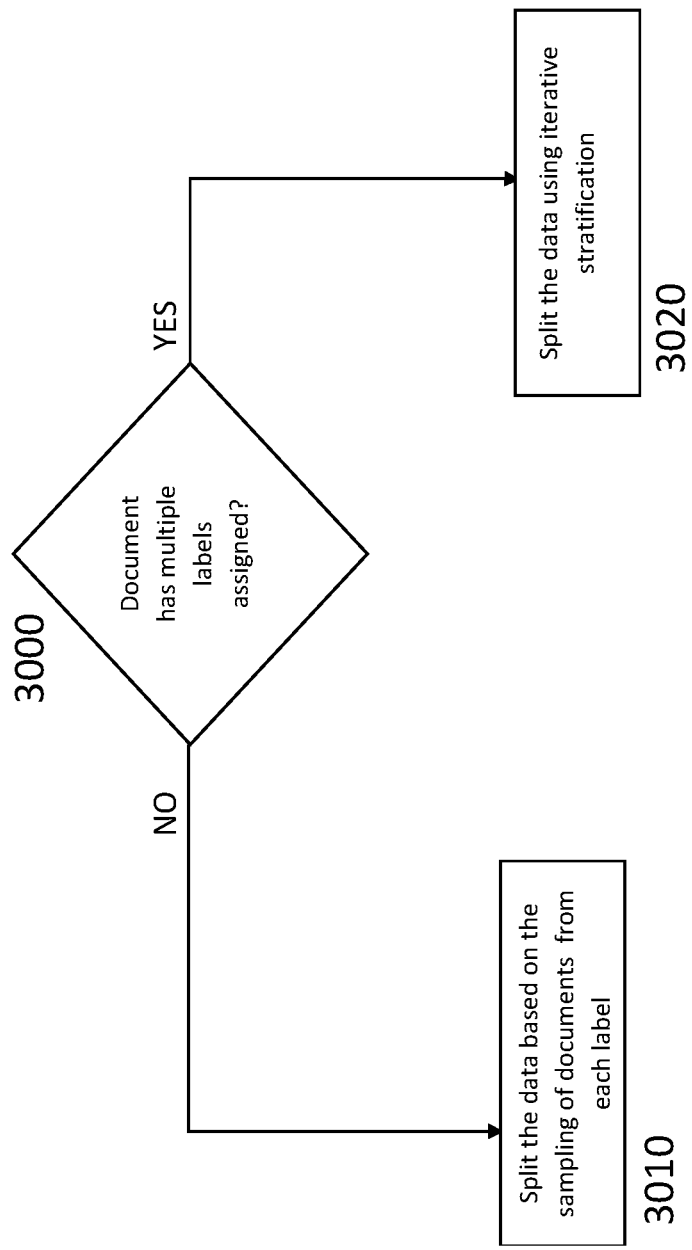
FIG. 3 is a flow chart of a method of dividing documents into training and testing sets.

FIG. 3 is a flow chart of a method of dividing documents into training and testing sets. Splitting 1010 the documents into training and testing sets begins with a determination 3000 of whether any documents have multiple labels assigned to them. If none of the documents have multiple labels assigned, the splitting 3010 comprises randomly permuting the documents to which each label is assigned. The random permutation can be performed using any technique known in the art that creates unbiased samples for the training and testing sets for each label. The random permutation also splits the documents into training and testing sets based on a predetermined proportion. In one embodiment the predetermined proportion is determined directly by a user, such as by entering the proportion via a user interface. In another embodiment, the predetermined proportion is determined indirectly by a user, such as by selecting from a list of relative proportions, from a list of document types, or by selecting from any other appropriate criteria. In another embodiment, an automated system determines the predetermined proportion based on the number of documents, the type of documents, the relative lengths of the documents, or any other appropriate basis known in the art. If one or more documents have multiple labels assigned, the splitting 3020 comprises iterative stratification, discussed further below regarding FIG. 4.

Figure 4:
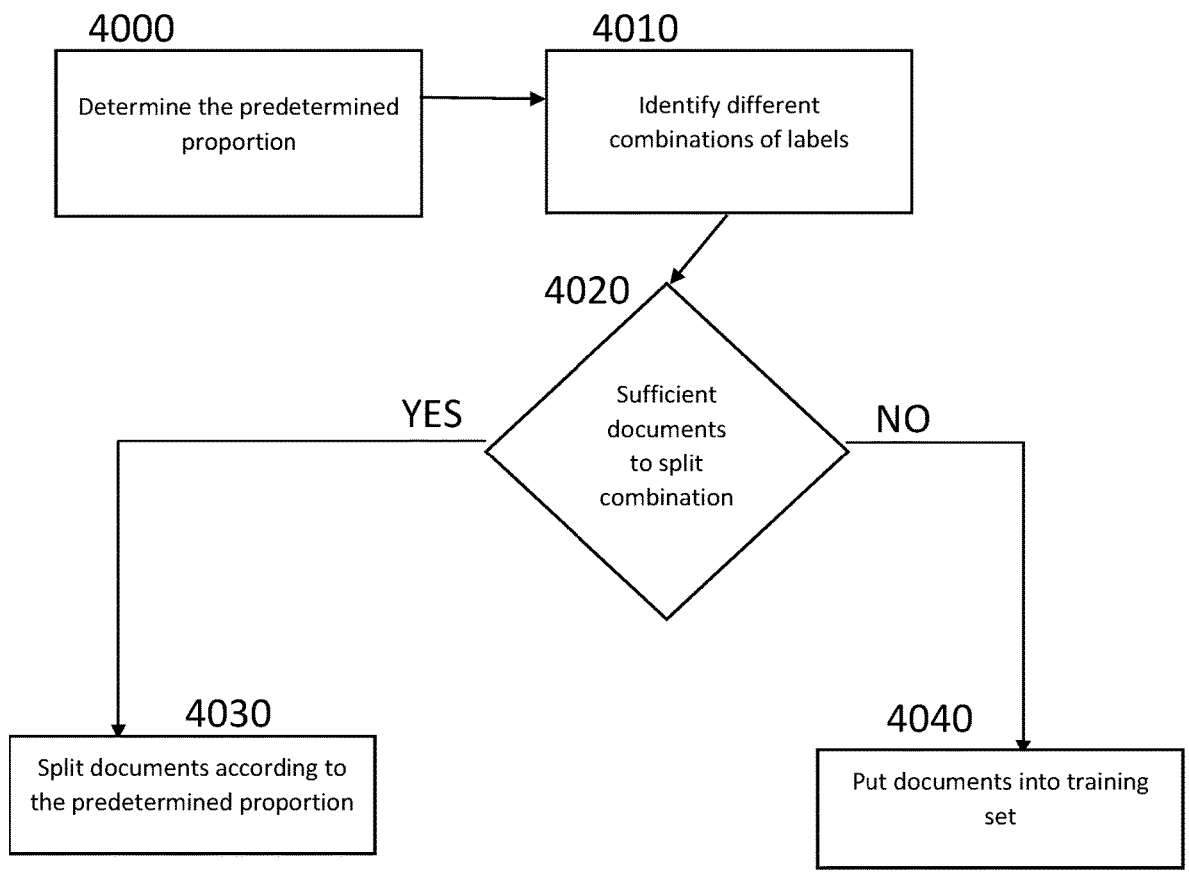
FIG. 4 is a flow chart of an iterative stratification process.

FIG. 4 is a flow chart of an iterative stratification process. Determining 4000 the predetermined proportion comprises any of the methods discussed above regarding FIG. 3. Identifying 4010 different combinations of labels comprises one or more of the following methods. In one embodiment, a user selects combinations of labels. In this embodiment, the user may select labels from a list, enter combinations of labels manually, or use any other appropriate technique known in the art. In embodiments where labels are selected from a list, the list may be a list of all or a subset of the labels or possible combinations of labels in the documents. Alternatively, the list may be generated using techniques similar to those discussed above. Further, the list may be generated using a combination of these methods. In another embodiment, the combinations of labels comprise all possible combinations of any number of labels assigned to the documents. In another embodiment, the combinations of labels comprise all possible combinations of a predetermined number of labels assigned to the documents (e.g., every possible combination of 3 labels). In similar embodiments, the predetermined number of labels may be an upper or power bound (e.g., every possible combination of 3 or fewer labels or every possible combination of 3 or more labels).

Determining 4020 whether there are a sufficient number of documents with an identified combination of labels assigned to them comprises: for each identified combination of labels, tallying the number of documents that have that identified combination of labels assigned to them; identifying a threshold value; and identifying which identified combinations of labels are assigned to a number of documents at or above the threshold value. In one embodiment, the threshold value is determined by a user. In another embodiment, the threshold value is determined by an automated system. In embodiments where the threshold value is determined by an automated system, the threshold value may be determined based on the number of documents, the number of labels, the number of identified combinations of labels, the category or type of documents or labels, or any other appropriate criteria known in the art. In these embodiments, the threshold value may be determined based on historical data regarding the accuracy of the labels. Alternatively, or in addition, the threshold value may be based at least in part on statistical analysis or other techniques related to model accuracy. In another embodiment the threshold value may be selected by a user from a list of options generated by an automated system as discussed above.

In one embodiment, a hashing table (i.e., key, values table) is created in which each key is an identified combination of labels, and the value is an identifier associated with a document to which the identified combination of labels is assigned.

If the number of documents with a given identified combination of labels assigned is at or above the threshold value, the documents are split 4030 into training and testing sets based on a predetermined proportion. The predetermined proportion is determined as discussed above regarding FIG. 3. If the number of documents with a given identified combination of labels assigned is below the threshold value, all of the documents are put into the training set.

Figure 5:
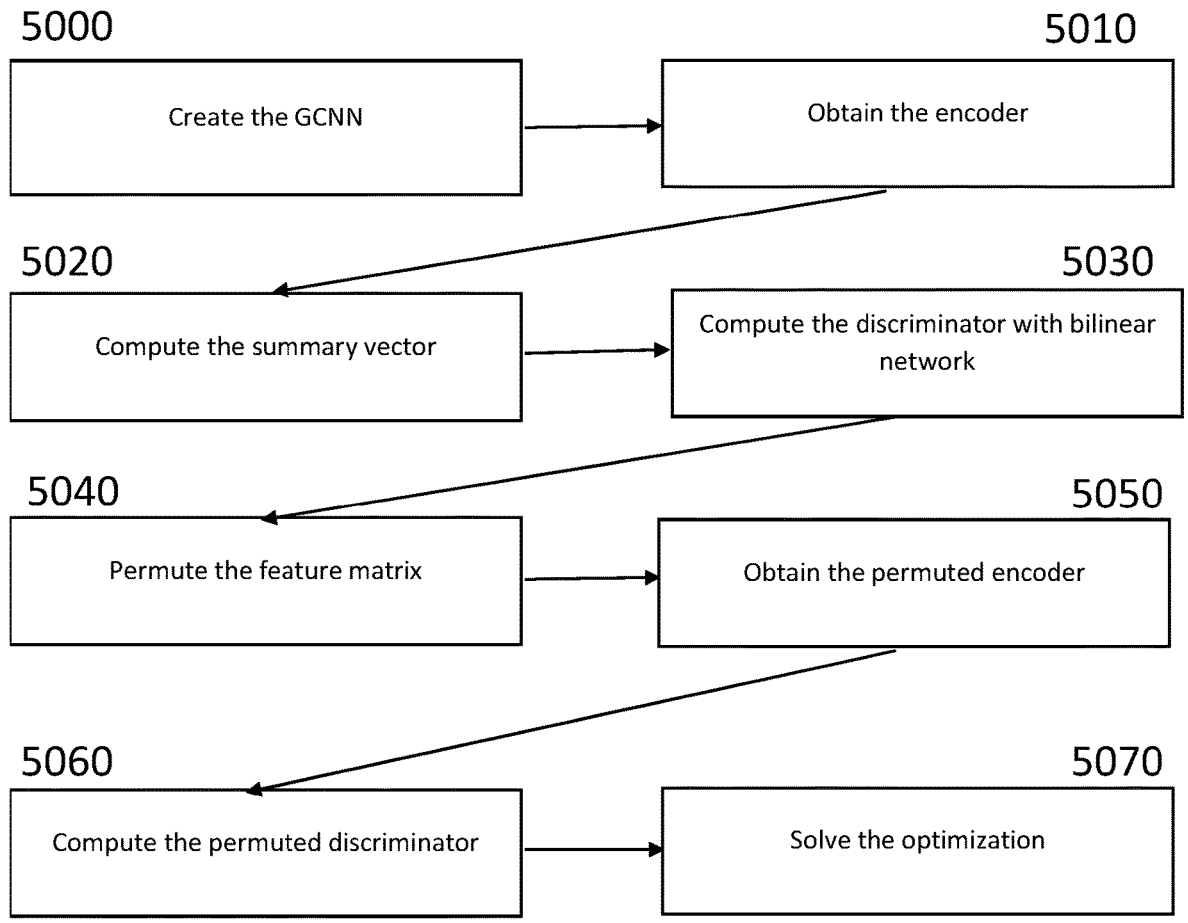
FIG. 5 is a flow chart of a method of embedding documents using a graph convolutional neural network.

FIG. 5 is a flow chart of a method of embedding documents using a graph convolutional neural network. After constructing the network graph matrix A and optionally constructing the feature matrix X, a multi-layer neural network operating directly on the network graph matrix is created 5000. This multi-layer neural network is called a Graph Convolutional Neural Network (GCNN). In this GCNN, the network graph matrix A is re-written as follows:

$$\tilde{A} = D^{\frac{-1}{2}} A D^{\frac{1}{2}}$$

D is a degree matrix as known in the art. A new dimensional feature for each node is computed as:

$$L = \rho(\tilde{A}XW)$$

W is a weighted matrix for each layer, and is initialized using the Glorot initialization, as known in the art, or using any other appropriate initialization. ρ is a function to activate each neuron in the neural network for computation.

Each document is represented as a numerical vector also known as embedded vector. The embedded vector is created via node embedding, to reflect the relationships between the document and the words it contains. To perform node embedding in a neural network graph, the following encoder is computed 5010:

$$\varepsilon(X,A) = H = \{h_1, \ldots, h_N\}$$

N is the number of nodes in the network graph matrix A, and $h_i$ is the encoder for each node.

Since the encoder h i does not capture global information of the entire network graph matrix A without supervision, the global information of the entire network graph matrix is captured by a summary vector g. The summary vectors is obtained 5020 through a readout function R(H), which has the following formulation:

$$R(H) = \sigma\left(\frac{1}{N}\sum_{i=1}^{N} h_i\right)$$

σ is a logistic sigmoid function. To capture the global information of the entire network graph matrix in the embedded node, the local mutual information between the encoder vector $h_i$ and the summary vector $\vec{s}$ is maximized. This maximization is achieved through a discriminator M, which represents the probability scores between each encoder $h_i$ and the summary vector $\vec{s}$. The discriminator M is computed 5030 through a bilinear neural network, which combines two inputs to produce one output.

A negative sampling technique is used to ensure that the node fits in the context of the network graph matrix as the local mutual information is maximized. The negative sampling technique calculates how well the node fits when the network graph matrix is permuted, as follows: the matrix X is permuted 5040 to create a new feature matrix $\tilde{X}$; a permuted set of encoders $\tilde{H} = \varepsilon(\tilde{X},A)$ is calculated 5050; a permuted discriminator $\tilde{M}$ is calculated 5060 for each permuted encoder $\tilde{h}$ and the summary vector $\vec{s}$; then, the following objective function is minimized 5070 to obtain the value for each encoder:

$$L = \frac{1}{N+M}\left(\sum_{i=1}^{N} E\left(\log\left(M\left(h_i, \vec{s}\right)\right)\right) + \sum_{j=1}^{M} E\left(\log\left(1 - \tilde{M}\left(\tilde{h}_j, \vec{s}\right)\right)\right)\right)$$

Figure 6:
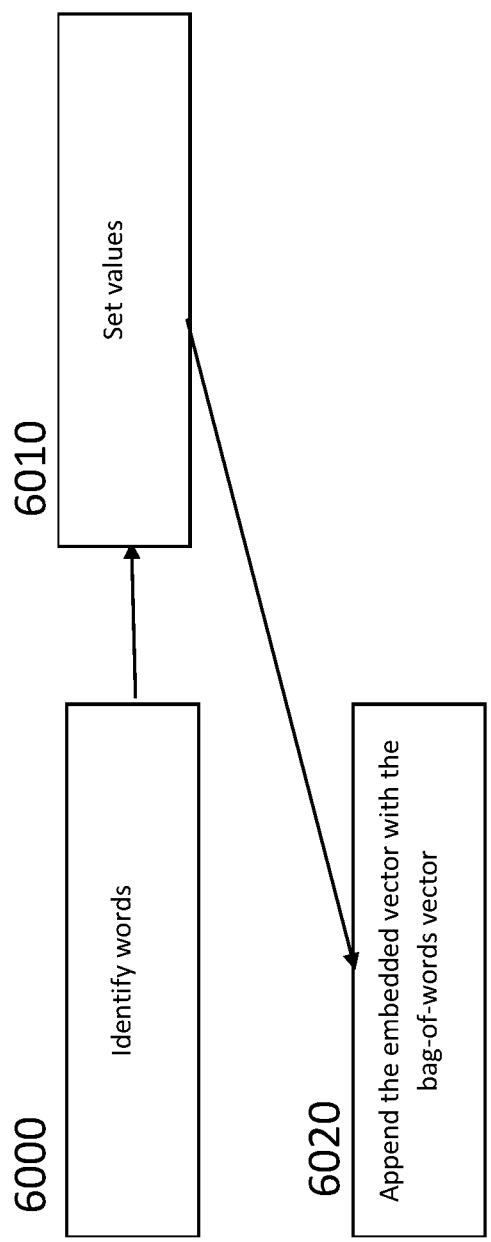
FIG. 6 is a flow chart of a method of enhancing embedded values for each document with a bag-of-words approach.

FIG. 6 is a flow chart of a method of enhancing embedded vectors for each document with a bag-of-words approach. The embedded node described above contains information for the entire network graph matrix, which may make it difficult to distinguish features among documents. In order to disentangle these features, the embedded nodes are enhanced using a bag-of-words approach. Applying the enhancement comprises: identifying 6000 each word that appears in any of the documents; for each word that appears in a given document, set 6010 the value associated with that word to 1; append 6020 the resulting vector to the numerical vector created via node embedding, as discussed above with regard to FIG. 5.

Figure 7:
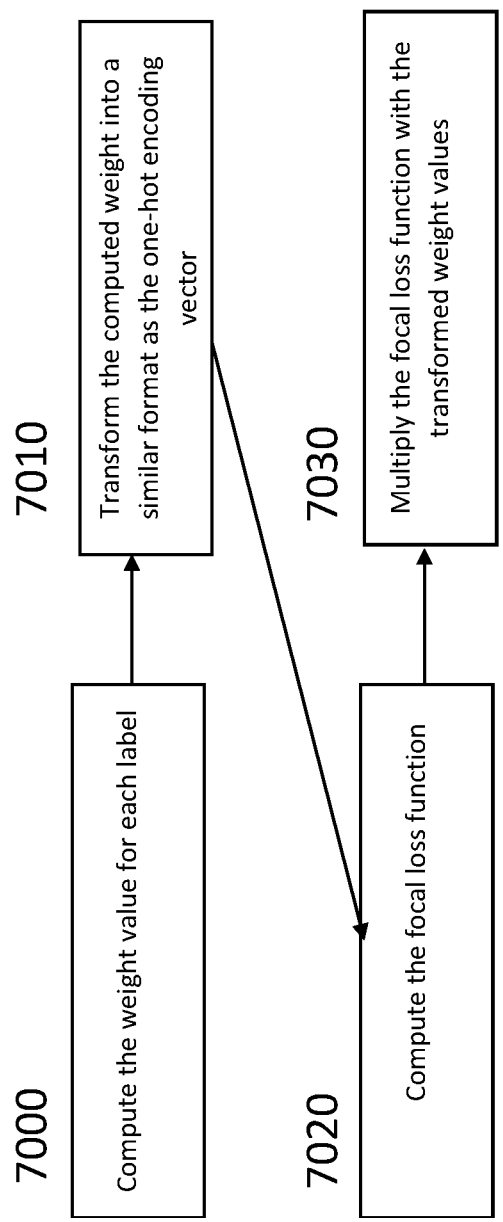
FIG. 7 is a flow chart of a method of generating focal loss function values and modified focal loss function values.

FIG. 7 is a flow chart of a method of generating modified focal loss function values. The modified focal loss function is used to account for imbalances in the number of times each label is used.

The algebraic weight values for each label may be computed 7000 using any appropriate technique known in the art. The weight values for each label are represented as a numerical vector with two columns. The number of rows of the vector equals the number of columns in the one-hot encoding vector for the label. The first column is the weight values for the 0s, and the second column is the weight values for the 1s in the one-hot encoding vector for the label.

After the weight values are computed, the weights are transformed 7010 into an encoding vector format, similar to the one-hot vector described above, in which the values of 1 are replaced with the computed weights. In the equations below, the transformed weight is $w_f$.

After the weight values are transformed, the focal loss function is calculated as follows:

$$FL = -\alpha(1-p_t)^\gamma \log(p_t)$$

where $p_t$ is calculated as follows:

$$p_t = \begin{cases} p & \text{if the one-hot vector has the value of 1} \\ 1-p & \text{otherwise} \end{cases}$$

where p is the probability for each label, $\gamma$ is the focusing parameter for minor labels (i.e. labels with less documents associated), and $\alpha$ is the balanced parameter.

In some embodiments, the focal loss function described above may be used to label documents. In other embodiments, the focal loss function is modified by multiplying it by the transformed weight, $w_t$:

$$mFL = -w_f \alpha (1-p_t)^\gamma \log(p_t)$$

Using the modified focal loss function provides more accurate labels when 60% or more of the documents have the same label(s) assigned to them.

The embodiments described above may be implemented using any form of appropriate computing-based device.

Figure 8:
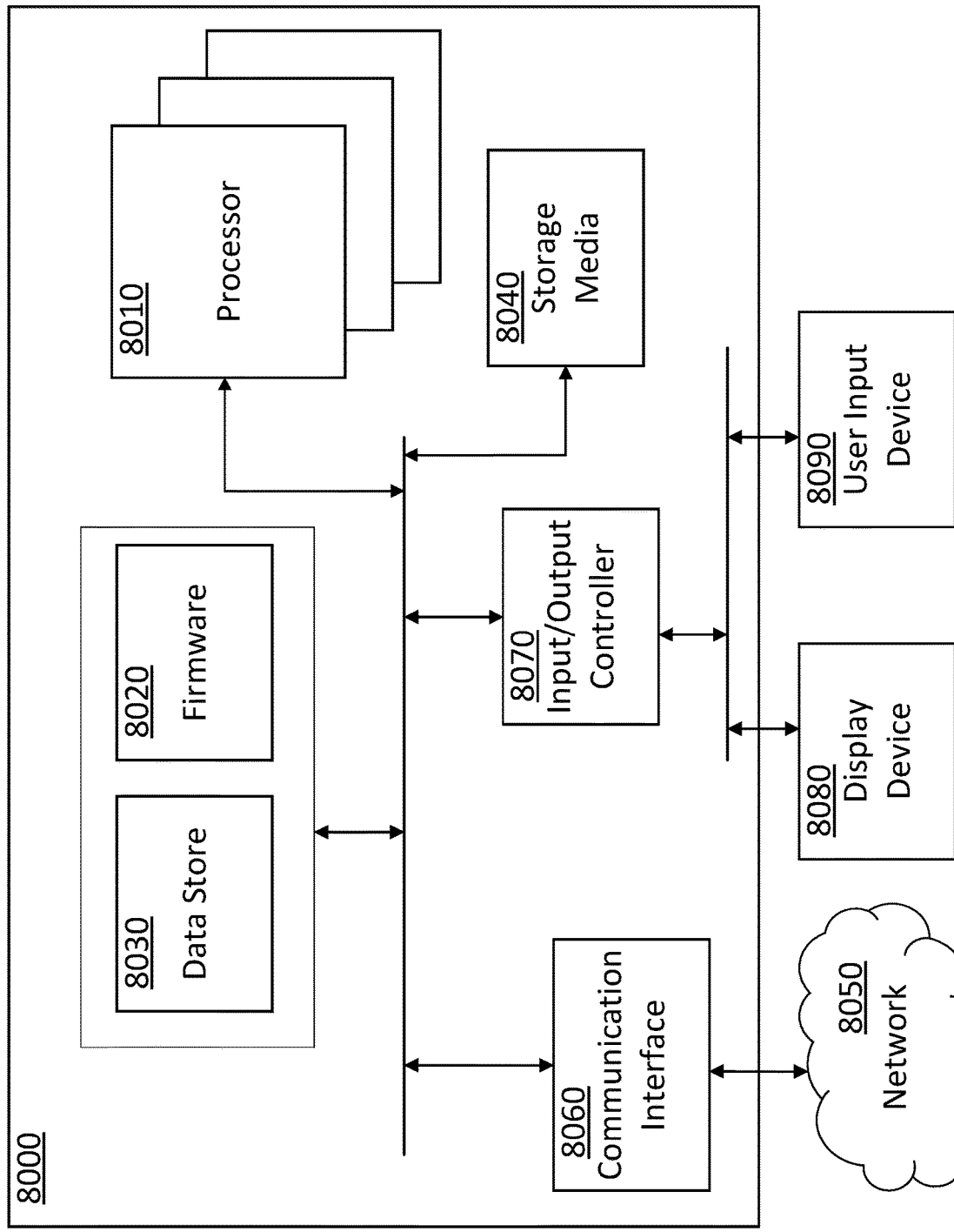
FIG. 8 is an illustration of an exemplary computing-based device.

FIG. 8 illustrates various components of an exemplary computing-based device 8000 which may be implemented as any form of a computing and/or electronic device, and in which embodiments of a controller may be implemented.

Computing-based device 8000 comprises one or more processors 8010 which may be microprocessors, controllers, or any other suitable type of processors for processing computer executable instructions to control the operation of the device. In some examples, for example where a system on a chip architecture is used, the processors 8010 may include one or more fixed function blocks (also referred to as accelerators) which implement a part of controlling one or more embodiments discussed above. Firmware 8020 or an operating system or any other suitable platform software may be provided at the computing-based device 8000. Data store 8030 is available to store sensor data, parameters, logging regimes, and other data.

The computer executable instructions may be provided using any computer-readable media that is accessible by computing based device 8000. Computer-readable media may include, for example, computer storage media such as memory 8040 and communications media. Computer storage media, such as memory 8040, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but signals per se, propagated or otherwise, are not examples of computer storage media. Although the computer storage media (memory 8040) is shown within the computing-based device 8000 it will be appreciated that the storage may be distributed or located remotely and accessed via a network 8050 or other communication link (e.g. using communication interface 8060).

The computing-based device 8000 also comprises an input/output controller 8070 arranged to output display information to a display device 8080 which may be separate from or integral to the computing-based device 8000. The display information may provide a graphical user interface. The input/output controller 8070 is also arranged to receive and process input from one or more devices, such as a user input device 8090 (e.g. a mouse, keyboard, camera, microphone, or other sensor). In some examples the user input device 8090 may detect voice input, user gestures or other user actions and may provide a natural user interface. This user input may be used to change parameter settings, view logged data, access control data from the device such as battery status and for other control of the device. In an embodiment the display device 8080 may also act as the user input device 8090 if it is a touch sensitive display device. The input/output controller 8070 may also output data to devices other than the display device, e.g. a locally connected or network-accessible printing device. The input/output controller 8070 may also connect to various sensors discussed above, and may connect to these sensors directly or through the network 8050.

The input/output controller 8070, display device 8080 and optionally the user input device 8090 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilising conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments and/or combine any number of the disclosed embodiments without departing from the spirit or scope of this specification.

The invention claimed is:

1. A method for automatically labeling documents comprising:
    receiving a plurality of documents;
    forming a network graph based at least in part on the documents, wherein forming a network graph comprises: forming a network graph in which each node represents either one of the plurality of documents or a word in one of the plurality of documents, where the network graph may be represented as a network graph matrix;
    connecting each of the plurality of documents to each of the words in the document;
    connecting each of the words in one of the plurality of documents to each of the other words in the document; and
    connecting each word to each of the plurality of documents in which the word appears;
    embedding the documents using a graph convolutional neural network;
    enhancing the embedded documents using a bag-of-words appending technique to disentangle features among documents from the network graph matrix for an embedded node; and
    labeling the documents using a neural network with a focal loss function to provide accurate labels for the documents.

2. The method of claim 1, further comprising:
    prior to forming the network graph based at least in part on the documents;
    preprocessing the plurality of documents;
    dividing the plurality of documents into training and testing sets; and
    processing the plurality of documents.

3. The method of claim 2, wherein processing the plurality of documents comprises:
    computing the frequency of each word in each document;
    computing the number of documents in which each word occurs; and
    mapping each word to a position across all documents.

4. The network graph of claim 1, wherein the weight value of an edge between a document and a word in the document is the term-frequency and inverse-document frequency and the weight value of an edge between words in the same document is the point-wise mutual information.

5. The method of claim 1, wherein embedding the documents using a graph convolutional neural network comprises:
    creating a multi-layer neural network operating directly on the network graph matrix;

obtaining an encoder;

computing a summary vector;

computing a discriminator; computing a permuted discriminator; and minimizing an objective function.

6. The method of claim 1, wherein enhancing the embedded documents using a bag-of-words appending technique comprises:

identifying each word that appears in any of the documents;

for each document, generating a vector wherein the value associated with each word that appears in the document is set to 1; and appending the generated vector to the numerical vector created for the document when the document was embedded using a graph convolutional neural network.

7. The method of claim 1, wherein calculating the focal loss function comprises:

calculating the algebraic weight values for each label associated with the plurality of documents;

representing each algebraic weight value as a numerical vector with two columns wherein the number of rows of the vector equals the number of columns in a one-hot encoding vector for the label; and calculating the focal loss function as a function of the probability for each label, a focusing parameter, and a balanced parameter.

8. The method of claim 7, wherein calculating the modified focal loss function comprises:

transforming the algebraic weight values into an encoding vector format in which the values of 1 are replaced with the computed weights; and calculating the modified focal loss function as the product of the focal loss function and the transformed weight.

9. A method for identifying mis-labeled documents comprising:

receiving a plurality of documents;

forming a network graph based at least in part on the documents, wherein forming a network graph comprises:

forming a network graph in which each node represents either one of the plurality of documents or a word in one of the plurality of documents, where the network graph may be represented as a network graph matrix;

connecting each of the plurality of documents to each of the words in the document;

connecting each of the words in one of the plurality of documents to each of the other words in the document; and connecting each word to each of the plurality of documents in which the word appears;

embedding the documents using a graph convolutional neural network;

enhancing the embedded documents using a bag-of-words appending technique to disentangle features among documents from the network graph matrix for an embedded node;

using a focal loss function to calculate a probability value for each label associated with the plurality of documents; and identifying mis-labeled documents, the identification based at least in part on the probability value.

10. The method of claim 9, further comprising:

prior to forming the network graph based at least in part on the documents;

preprocessing the plurality of documents;

dividing the plurality of documents into training and testing sets; and processing the plurality of documents.

11. The method of claim 10, wherein processing the plurality of documents comprises:

computing the frequency of each word in each document;

computing the number of documents in which each word occurs; and mapping each word to a position across all documents.

12. The network graph of claim 9, wherein the weight value of an edge between a document and a word in the document is the term-frequency and inverse-document frequency and the weight value of an edge between words in the same document is the point-wise mutual information.

13. The method of claim 9, wherein embedding the documents using a graph convolutional neural network comprises:

creating a multi-layer neural network operating directly on the network graph matrix;

obtaining an encoder;

computing a summary vector;

computing a discriminator; computing a permuted discriminator; and minimizing an objective function.

14. The method of claim 9, wherein enhancing the embedded documents using a bag-of-words appending technique comprises:

identifying each word that appears in any of the documents;

for each document, generating a vector wherein the value associated with each word that appears in the document is set to 1; and appending the generated vector to the numerical vector created for the document when the document was embedded using a graph convolutional neural network.

15. The method of claim 9, wherein calculating the focal loss function comprises:

calculating the algebraic weight values for each label associated with the plurality of documents;

representing each algebraic weight value as a numerical vector with two columns wherein the number of rows of the vector equals the number of columns in a one-hot encoding vector for the label; and calculating the focal loss function as a function of the probability for each label, a focusing parameter, and a balanced parameter.

16. The method of claim 15, wherein calculating the modified focal loss function comprises:

transforming the algebraic weight values into an encoding vector format in which the values of 1 are replaced with the computed weights; and calculating the modified focal loss function as the product of the focal loss function and the transformed weight.

17. The method of claim 9, wherein the probability value is calculated using iterative stratified sampling.

18. The method of claim 9, wherein the probability value is calculated using k-fold stratified sampling.

* * * * *